United States Patent [19]

Levine et al.

[11] Patent Number: 5,170,485
[45] Date of Patent: Dec. 8, 1992

[54] HAND-OFF ALGORITHM FOR ELONGATED RADIOTELEPHONE CELLS

[75] Inventors: Stephen N. Levine, Itasca; Larry C. Puhl, Sleepy Hollow, both of Ill.

[73] Assignee: Motorola, Inc., Schaumburg, Ill.

[21] Appl. No.: 609,860

[22] Filed: Nov. 7, 1990

[51] Int. Cl.$^5$ .............................................. H04Q 7/00
[52] U.S. Cl. ................................ 455/33.2; 455/33.4; 455/89; 455/54.1; 379/60
[58] Field of Search ...................... 455/33, 54, 56, 67, 455/89; 379/59, 60

[56] References Cited

U.S. PATENT DOCUMENTS 5,042,082 8/1991 Dahlin .................................. 379/60

OTHER PUBLICATIONS

Jansson et al., "The Future of Cellular Telephony" Ericsson Review No. 1, vol. 67 1990 pp. 42-52.

Primary Examiner—Reinhard J. Eisenzopf
Assistant Examiner—Andrew Faile
Attorney, Agent, or Firm—Kenneth W. Bolvin

[57] ABSTRACT

The hand-off process of the present invention minimizes the number of hand-offs in radiotelephone system using smaller, elongated cells that may provide radiotelephone coverage in an urban environment along streets. While in the idle mode, the process of the present invention keeps track of the radiotelephone's direction of travel. When the radiotelephone is making a call, the base station process of the present invention keeps track of any fade condition that occurs, both short term and long term, and hands the radiotelephone off to another cell if one of these conditions occur.

6 Claims, 2 Drawing Sheets

MAHO=MOBILE ASSISTED HAND-OFF

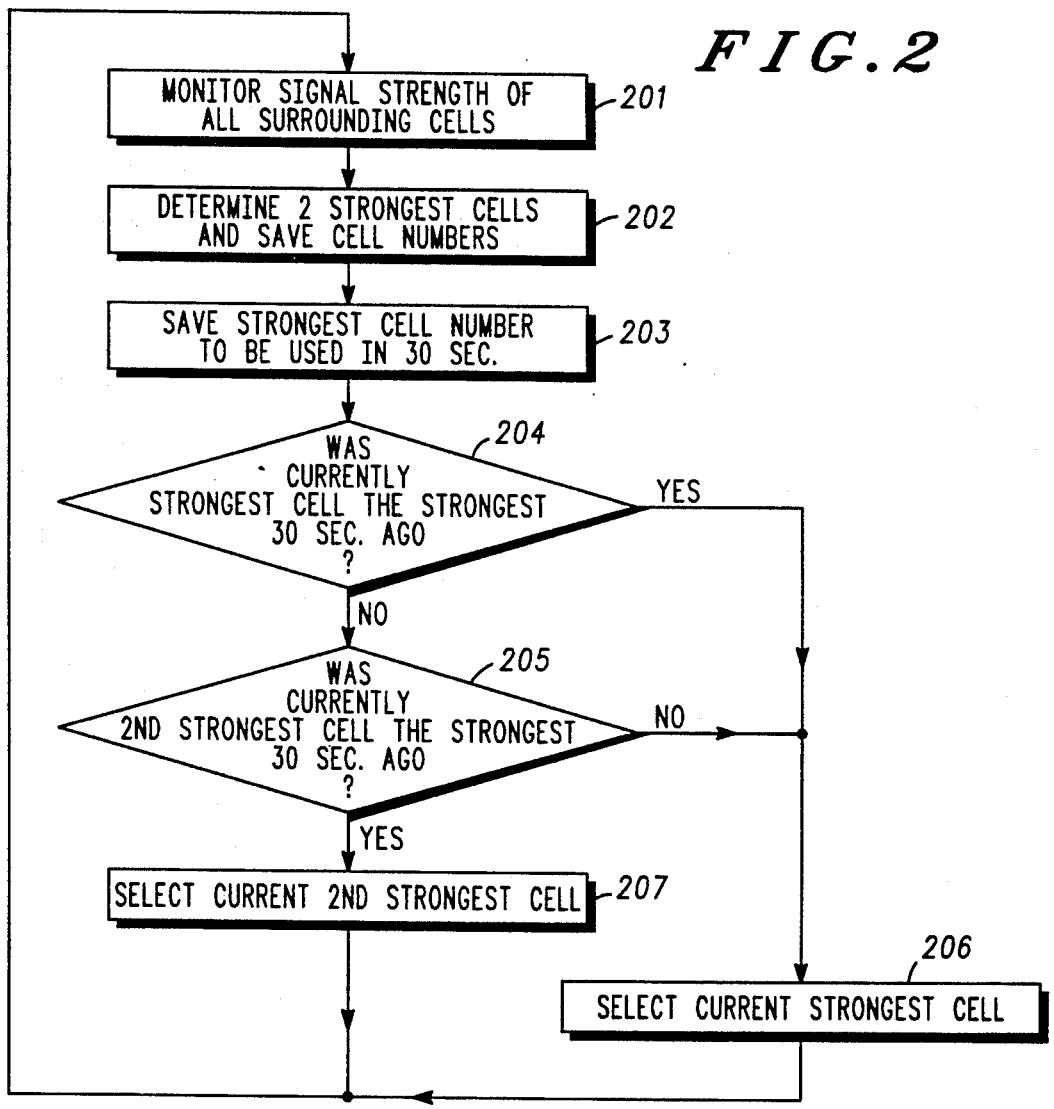

HAND-OFF ALGORITHM FOR ELONGATED RADIOTELEPHONE CELLS

FIELD OF THE INVENTION

The present invention relates generally to the field of radiotelephone communications and particularly to handing-off radiotelephones between cells.

BACKGROUND OF THE INVENTION

A cell in present cellular radiotelephone communications systems typically includes six directional antennas, centrally located in the cell, each radiating into a 60° sector of the cell. A plurality of these cells is combined to form a cellular radiotelephone communications system covering a geographical area. This cellular system enables mobile radiotelephone traffic to communicate with landline telephone networks and other mobile radiotelephones while moving through the area. An example of such a radiotelephone can be seen in Motorola manual #68P81049E55 available from Motorola, Inc., 1313 East Algonquin Road, Schaumburg, Ill. 60196.

Each cell has a number of frequencies, transmitted by low power transmitters, assigned to it that cannot be used in adjacent cells because of frequency interference problems. Due to the low power of the cell's transmitters, however, the same frequency can be reused in other cells, referred to as co-channel cells, in the same metropolitan area A radiotelephone operating in a cellular system must identify itself to the system servicing the radiotelephone, allowing the system to interface the radiotelephone to the landline telephone system. The identification typically informs the system that the radiotelephone is active in that particular system in addition to telling the system the telephone number assigned to the radiotelephone. This identification is accomplished when the radiotelephone is powered up and receiving but not transmitting, in other words, in an idle state.

Autonomous registration is such an identification method. U.S. Pat. No. 4,775,999 to Williams, assigned to Motorola, Inc., describes such a registration method. This registration is performed at various time intervals to indicate that the radiotelephone is active in the system.

During a call, when a mobile radiotelephone moves from one cell to another, it must be handed-off to the next cell in order to continue communicating. This hand-off procedure is accomplished as follows for the analog cellular system. The cell serving the mobile and neighboring cell sites scans (takes samples of) the received mobile signal strength. This information is collected at the switch and a decision is made whether to hand-off the mobile to a neighboring cell. For the U.S. Digital Cellular System, as outlined in the Electronic Industries Association/Telecommunications Industry Association (EIA/TIA) Standard IS-54 document, the mobile radiotelephone also collects channel quality information (channel bit error rate (BER) and signal strength) on its own channel and signal strength measurements on neighboring cell channels. This information is transmitted to the serving cell site as a mobile assisted hand-off (MAHO) message to be added to the base scan information for making a hand-off decision.

By reducing the size of the cells, frequency reuse can be increased, thereby increasing the amount of radiotelephone traffic a cellular system can handle. As the size of the cells are reduced, the shape becomes less circular and more elongated to provide coverage to the streets. This type of elongated cell is illustrated in FIG. 1.

When the size of the cell is reduced, however, the hand-off method must be changed. Since the cells are now smaller, the mobile radiotelephone travels between cells more frequently, requiring more frequent hand-offs. This requires the cell base station to spend an inordinate amount of time evaluating hand-off conditions, reducing the cell's traffic handling capacity. There is a resulting need for a hand-off method for use in small radiotelephone cells allowing the cells to operate at normal capacity.

SUMMARY OF THE INVENTION

The hand-off process of the present invention is used to minimize the number of hand-offs in a radiotelephone system using smaller, elongated cells that may be used in an urban environment along streets. The process of the radiotelephone keeps track of the direction of travel of the radiotelephone, while in the idle mode, and ignores the intersecting cells, handing-off only when the radiotelephone turns a corner to travel through another cell covering another street.

The process of the present invention for the base station keeps track of the radiotelephone while making a call. This process does a short interval integration first to determine if the radiotelephone should be handed-off. The base station scan receiver determines the strength of the radiotelephone's signal to determine if the radiotelephone is experiencing a fade. The base station also performs a longer term integration to determine if the radiotelephone is experiencing a fade over a longer period.

BRIEF DESCRIPTION OF THE DRAWINGS

FIG. 2 shows a flowchart of the selection process of the present invention for a radiotelephone in the idle state.

DETAILED DESCRIPTION OF THE PREFERRED EMBODIMENT

The process of the present invention minimizes the number of hand-offs in a cellular system having elongated cells. By keeping track of the radiotelephone's direction of travel, the cellular system can minimize the number of hand-offs, thereby allowing the system to operate at full capacity.

The selection algorithm of the present invention used by the radiotelephone to select a cell while in the idle state, illustrated in FIG. 2, resides in the radiotelephone with the prior art hand-off algorithms that are used in a circular cellular system. The hand-off algorithm of the present invention used by the base station to hand-off a radiotelephone, illustrated in FIG. 3, resides in the base station.

The system must indicate to the radiotelephone when it is in a cellular system using elongated cells since the algorithms of the present invention only work in elongated cells. The system informs the radiotelephone that it is in an elongated cell by setting a code in the overhead message train. This code is defined as a reserved code for future use in the EIA Standard 553.

Figure 1:
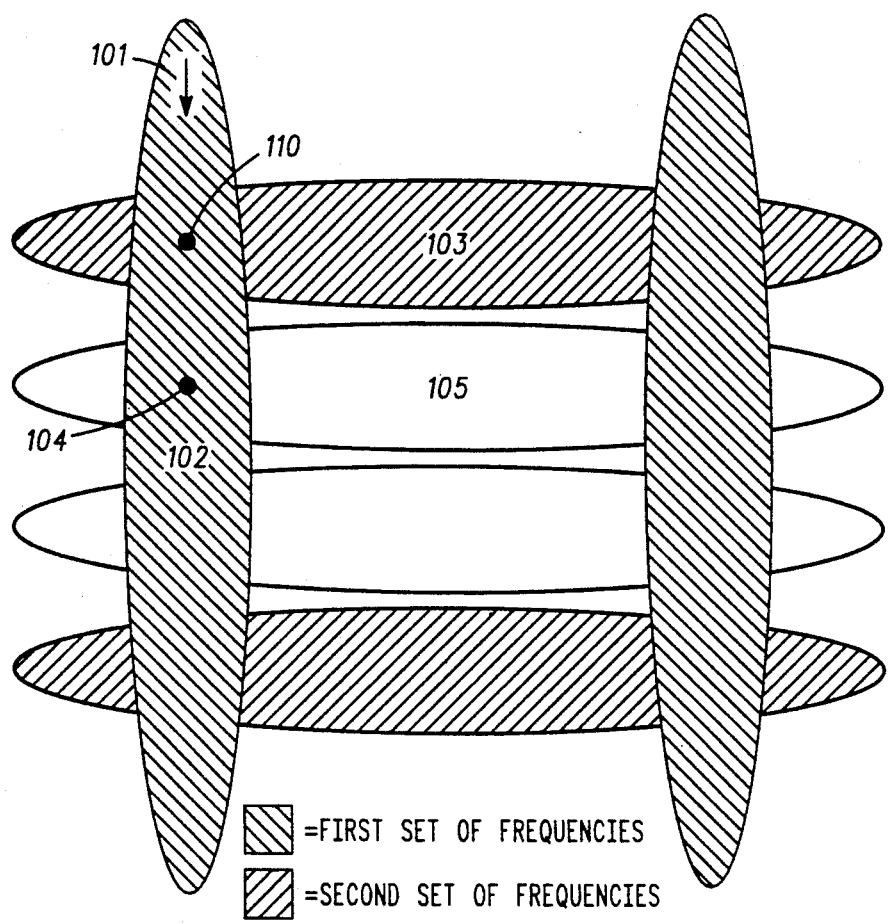
FIG. 1 shows an elongated cell layout covering a geographical area.

The elongated cell layout used by the algorithms of the present invention is illustrated in FIG. 1. These cells are designed to cover roads in an urban environment. If the radiotelephone enters a building, communication will be lost with the elongated cells. In this case, the radiotelephone is handed off to a microcell handling that particular building. This type of microcellular structure is discussed in U.S. Pat. No. 4,797,947 to Labedz, assigned to Motorola, Inc.

Referring to the cell layout of FIG. 1 and the process of FIG. 2, a radiotelephone at an intersection (110) of a two cell radiation pattern has a choice of two cells to use for communication: the one in the direction of travel (102) and the one perpendicular to the direction of travel (103). The process of the present invention minimizes the number of hand-offs by using the cell in the radiotelephone's direction of travel. Initially, the strength of signals from the surrounding cells, measured over a period of 30-60 seconds of travel, is monitored (201). These signal strengths are used to determine the two strongest cells (202) and the numbers of these cells are stored in the radiotelephone's memory. A cell along the direction of travel (102) will appear strong over this interval of time. A cell that is perpendicular to the direction of travel (103, 105, 107, and 109) will have only one strong reading as the radiotelephone passes through that cell.

Next, the currently strongest cell of the two is stored so that it can be used in thirty seconds (203). If the cell that is currently strongest appeared strongest thirty seconds ago (204), then that cell is selected for communication (206). If the currently second strongest cell appeared strongest thirty seconds ago (205) then the currently second strongest cell is selected for communication (207) since it is the one in the direction of travel. This second condition can occur when the radiotelephone enters an intersection.

An example of this algorithm can be seen by referring to FIG. 1. If the radiotelephone begins at point 101 and travels south in cell 102, the initially two strongest cells are 102 and 103. 103 is the strongest since the radiotelephone is closest to its center radiating antennas. As the radiotelephone travels south through 102 towards point 104, it is getting closer to the center of 102 and farther from 103. At 104, the algorithm requires that if the current strongest cell (102) was the strongest thirty seconds prior, cell 102 should be used. In this example, this is not the case. The algorithm next requires that if the currently second strongest cell (105) was strongest thirty seconds prior that cell 105 should be used. In this example, this is also not the case so the algorithm requires that the currently strongest cell (102) should be used for communication.

The algorithm shown in FIG. 2 is used to assure that the cell selected for communication is along the direction of travel. Since vehicles are more likely to go straight at an intersection that turn, this algorighm minimizes the number of hand-offs. Alternate embodiments of this algorithm are possible, however, the algorithm needs to record the signal strength of one or more cells for comparison at a later time.

If the mobile turns at an intersection, the hand-off to the cell in the new direction of travel must occur quickly in order to not interrupt communication. If the vehicle is making a turn, the algorithm shown in FIG. 2 would not be used since this algorithm is intended to minimize hand-offs for vehicles going straight. The best methods for recognizing a turn, in alternate embodiments, are to get an indication that the driver has turned his vehicle's turn signal on or to include a turn sensor that detects the turn.

Figure 3:
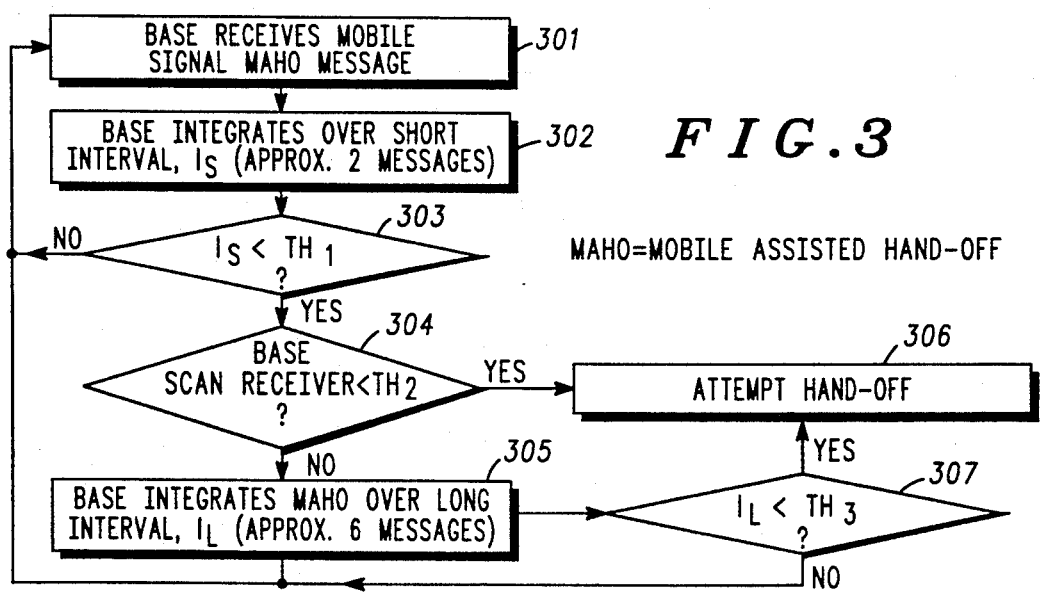
FIG. 3 shows a flowchart of the hand-off process of the present invention used by the base station for handing-off a radiotelephone that is transmitting or receiving a call.

The process of the present invention for handing off a radiotelephone that is currently making a call, accomplished by the base station, is illustrated in FIG. 3. The radiotelephone initially sends its mobile assisted hand-off (MAHO) message to the base station (301). This message is discussed in EIA/TIA Standard IS-54 and includes a channel quality indicator from the radiotelephone. The radiotelephone computes this indictor, which is a signal strength and bit error rate (BER) average, by taking twenty-five received signal strength and BER readings per second.

The base then integrates over a short time (302); the time of two MAHO messages in the preferred embodiment. If the result of this integration, $I_s$, is greater than a first predetermined threshold (303), a BER of 1.0% and RSSI measurement of −95 dBm in the preferred embodiment, the radiotelephone is not experiencing a fade from the present cell and the process repeats from the first step (301). If $I_s$ is less than the threshold, a fade is occurring and the cell's base station must determine if the radiotelephone should be handed-off to another cell. This is accomplished by a base station scan receiver in the base station monitoring the signal strength of the radiotelephone. This base scan receiver monitors the signal strengths of radiotelephones in a base station's cell or in surrounding cells.

If the base scan receiver gets a strong signal (304), then the cell does not hand-off the radiotelephone. The base scan receiver threshold is a BER of 1.0% and RSSI measurement of −95 dBm. Otherwise, the radiotelephone is experiencing a fade and the cell attempts a hand-off (306) to another cell. This fade could happen when the radiotelephone turns a corner onto another street.

If the cell does not attempt a hand-off, the base station determines if the radiotelephone is experiencing a fade over a longer period. This is accomplished by the base station integrating over a longer interval (305); approximately six MAHO messages in the preferred embodiment. If the result, $I_L$, is less than a third threshold (307), a BER of 1.0% and RSSI measurement of −95 dBm in the preferred embodiment, the radiotelephone is traveling too far from the base station and the base station should attempt to hand-off the radiotelephone (306). Otherwise, the radiotelephone is not experiencing a fade and the process repeats from the beginning (301).

In other words, if both the base station and the radiotelephone are experiencing a fade over a short period of time, the radiotelephone probably turned a corner to another cell or entered a building. This requires the base station to hand-off. If only the radiotelephone is experiencing a fade over a short period of time, the radiotelephone may be experiencing interference from another cell or from buildings and should not be handed-off. If the radiotelephone is experiencing a fade over a longer period, the radiotelephone probably turned a corner and should be handed-off.

In summary, a hand-off process has been shown that can be used in smaller, elongated radiotelephone cells. This process minimizes the number of hand-offs that would occur if prior art hand-off processes were used, thereby permitting the cell to operate at normal capacity.

We claim:

1. A method for handing-off a radiotelephone call, having a signal strength, from a first elongated, radiotelephone cell to a second elongated, radiotelephone cell, in a radiotelephone system having a plurality of elongated, radiotelephone cells, a radiotelephone device having a capability to transmit a Mobile Assisted Hand-Off (MAHO) message, the method comprising the steps of:

the radiotelephone device transmitting the MAHO message to the first elongated, radiotelephone cell;

integrating the MAHO message over a first predetermined time to produce $I_s$;

if $I_s$ is greater than a first predetermined threshold, repeating the method from the beginning;

if $I_s$ is less than the first predetermined threshold, measuring the signal strength of the radiotelephone call;

if the signal strength is less than a second predetermined threshold, attempting to hand-off the radiotelephone call to the second elongated, radiotelephone cell;

if the signal strength is greater than the second predetermined threshold, integrating the MAHO message over a second predetermined time to produce $I_L$, the second predetermined time being greater than the first predetermined time; and if $I_L$ is less than a third predetermined threshold, attempting to hand-off the radiotelephone call to the second elongated, radiotelephone cell.

2. The method of claim 1 wherein the first predetermined time is the length of two MAHO messages.

3. The method of claim 1 wherein the second predetermined time is the length of six MAHO messages.

4. The method of claim 1 wherein the first predetermined threshold is a BER of 1.0% and an RSSI measurement of −95 dBm.

5. The method of claim 1 wherein the second predetermined threshold is a BER of 1.0% and an RSSI measurement of −95 dBm.

6. The method of claim 1 wherein the third predetermined threshold is a BER of 1.0% and an RSSI measurement of −95 dBm.

* * * * *